(12) United States Patent
Chen

(10) Patent No.: US 8,602,403 B1
(45) Date of Patent: Dec. 10, 2013

(54) CAM ACTUATED CLAMPING DEVICE

(75) Inventor: Wei-Li Chen, Taichung (TW)

(73) Assignee: Lai Lien Steel Co., Ltd., Taichung (TW)

( * ) Notice: Subject to any disclaimer, the term of this patent is extended or adjusted under 35 U.S.C. 154(b) by 8 days.

(21) Appl. No.: 13/561,092

(22) Filed: Jul. 30, 2012

(51) Int. Cl.
*B25B 1/08* (2006.01)

(52) U.S. Cl.
USPC .......................................... 269/232; 81/57.18

(58) Field of Classification Search
USPC ......... 269/229, 200, 204, 232, 235; 81/57.18; 279/71
See application file for complete search history.

(56) References Cited

U.S. PATENT DOCUMENTS

| | | | | |
|---|---|---|---|---|
| 463,301 | A * | 11/1891 | Brandner | 74/424.78 |
| 720,688 | A * | 2/1903 | Hagedorn | 279/71 |
| 1,180,667 | A * | 4/1916 | Martin | 279/71 |
| 1,273,417 | A * | 7/1918 | Smith | 269/70 |
| 4,716,794 | A * | 1/1988 | Leppanen | 81/57.18 |
| 5,865,073 | A * | 2/1999 | Wilson et al. | 81/57.33 |
| 7,204,173 | B2 * | 4/2007 | Buck | 81/57.18 |
| 7,237,456 | B2 * | 7/2007 | Neves | 81/57.18 |
| 2013/0134642 | A1 * | 5/2013 | Chen | 269/6 |

* cited by examiner

*Primary Examiner* — Lee D Wilson
*Assistant Examiner* — Jamal Daniel

(57) ABSTRACT

A clamp includes a first cam assembly including a hollow first support, opposite first and second work piece clamping members partially disposed in the first support with a first slot defined therebetween, a bifurcated first cam lever on both sides of the first and second work piece clamping members with the first support in the first cam lever, and an annular first flange including a latching groove; a second cam assembly including a hollow second support, opposite third and fourth work piece clamping members partially disposed in the second support with a second slot defined therebetween, a bifurcated second cam lever on both sides of the third and fourth work piece clamping members with the second support in the second cam lever, and an annular second flange including an end reduction, a projection distal the reduction, and external threads; and a fastening member threadedly secured to the second flange.

3 Claims, 19 Drawing Sheets

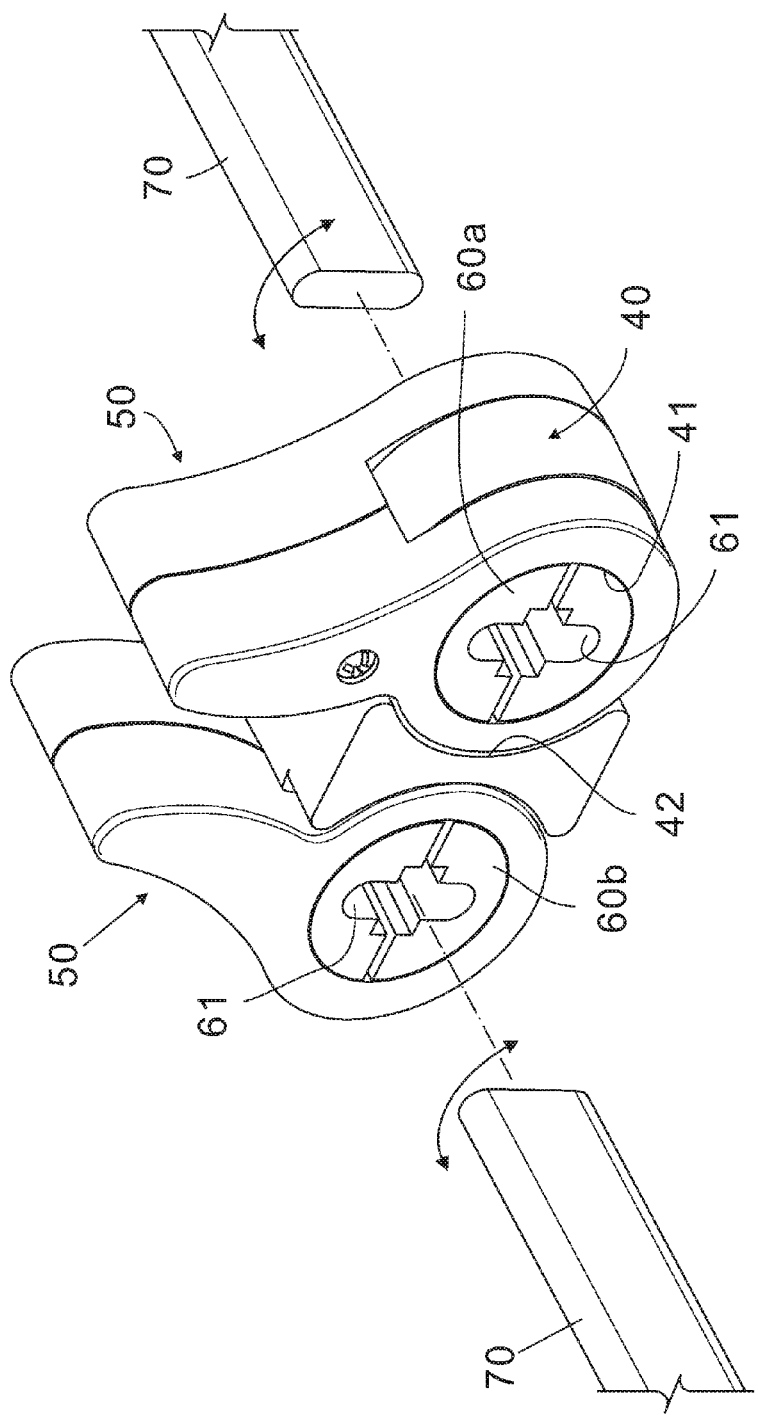

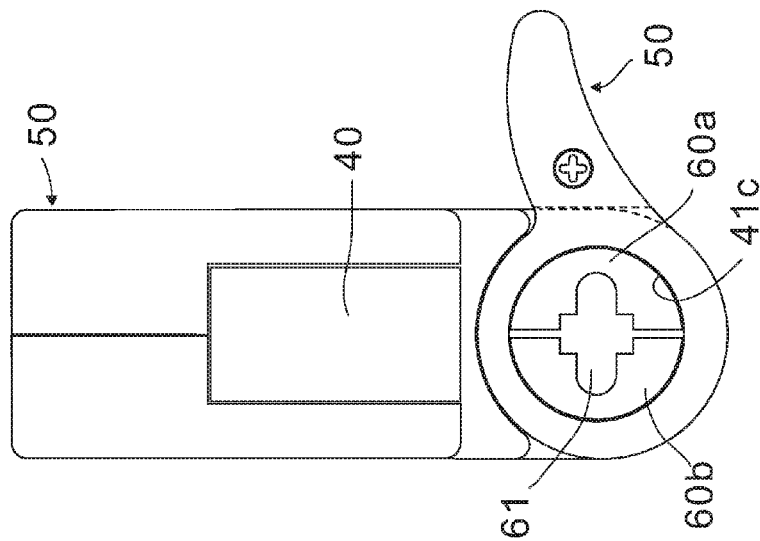
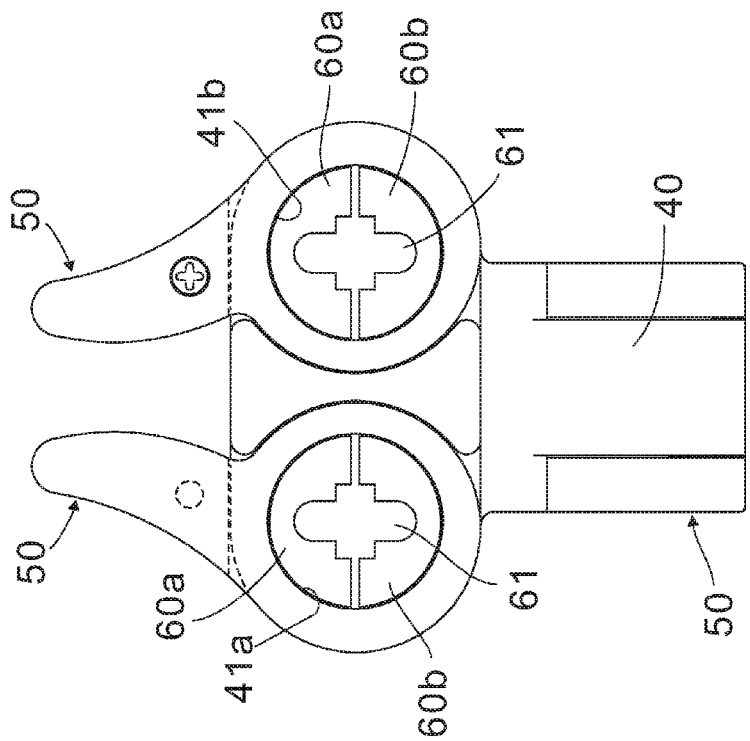

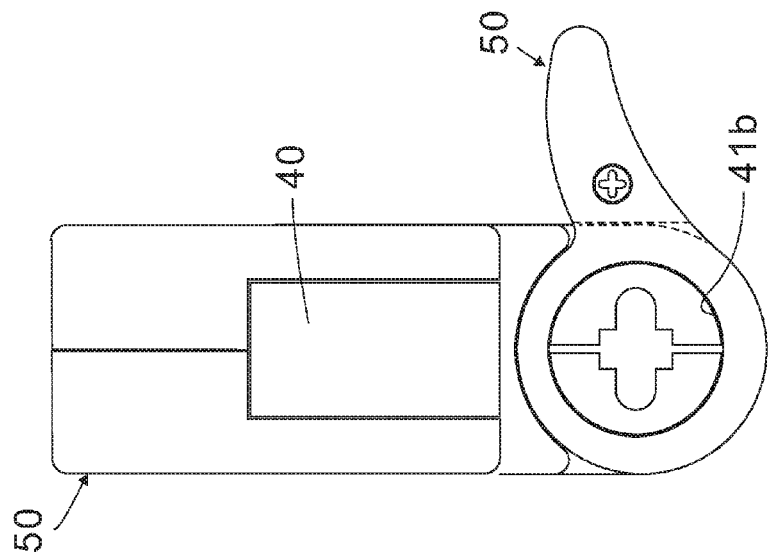
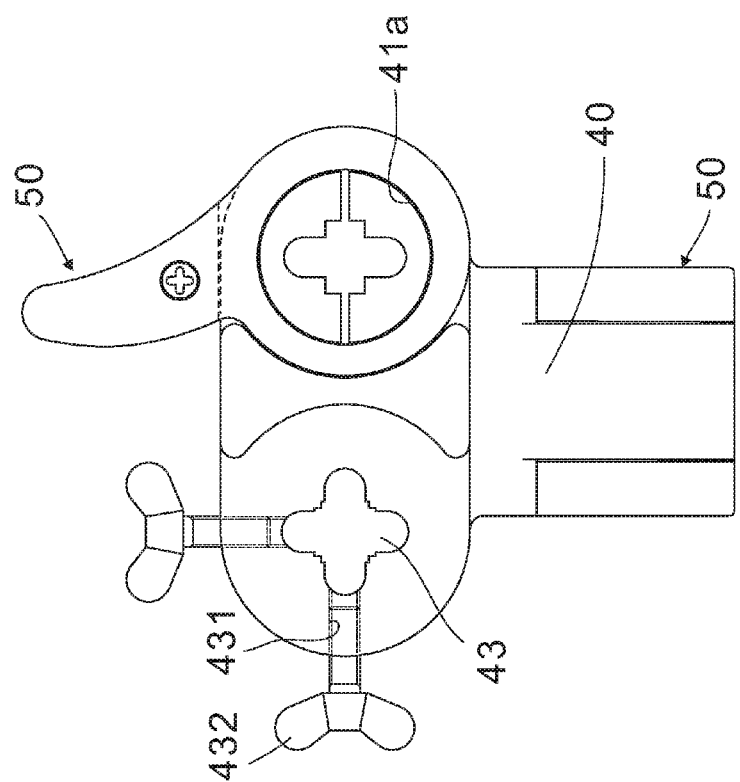

CAM ACTUATED CLAMPING DEVICE

BACKGROUND OF THE INVENTION

1. Field of the Invention

The invention relates to clamps and more particularly to a cam actuated clamping device with improved characteristics.

2. Description of Related Art

Mechanical devices (e.g., vises, clamps, etc.) used for holding or clamping a work piece to allow work to be performed on it with tools such as saws, planes, etc. are well known in the art. However, they are not adapted to hold work pieces of different and/or specially shaped. Thus, the need for improvement still exists.

SUMMARY OF THE INVENTION

It is therefore one object of the invention to provide a clamping device comprising a first cam assembly comprising a hollow first support, opposite first and second work piece clamping members partially disposed in the first support with a first slot defined between the first and second work piece clamping members, a bifurcated first cam lever disposed on both sides of the first and second work piece clamping members with the first support disposed in the first cam lever, and an annular first flange extending from an outer surface of the first support and including an annular latching groove at an open end; a second cam assembly comprising a hollow second support, opposite third and fourth work piece clamping members partially disposed in the second support with a second slot defined between the third and fourth work piece clamping members, a bifurcated second cam lever disposed on both sides of the third and fourth work piece clamping members with the second support disposed in the second cam lever, and an annular second flange extending from an outer surface of the second support and including an annular reduction at an open end, an annular projection distal the reduction, and external threads wherein the second flange is put on the first flange with the projection rotatably disposed in the latching groove; and a fastening member comprising a partially threaded inner surface threadedly secured to the external threads, and a truncated conic section extending from one end of the partially threaded inner surface to an open end proximate the first cam assembly; wherein a rotation of the fastening member along a predetermined direction urges the truncated conic section against the reduction which in turn urges against the first flange, thereby fastening the first cam assembly, the second cam assembly, and the fastening member together; wherein a clockwise rotation of the first cam lever pushes the first work piece clamping member and the second work piece clamping member toward each other by cooperating with the first support; and wherein a clockwise rotation of the second cam lever pushes the third work piece clamping member and the fourth work piece clamping member toward each other by cooperating with the second support.

The above and other objects, features and advantages of the invention will become apparent from the following detailed description taken with the accompanying drawings.

BRIEF DESCRIPTION OF THE DRAWINGS

FIG. 17 is a perspective view of FIG. 15 with two work pieces to be inserted into the slot;

FIG. 24 is a side elevation of a clamping device according to a third preferred embodiment of the invention with a first configuration being shown;

FIG. 25 is another side elevation of FIG. 24;

FIG. 26 is a side elevation of a second configuration of the third preferred embodiment; and FIG. 27 is another side elevation of FIG. 26.

DETAILED DESCRIPTION OF THE INVENTION

Referring to FIGS. 1 to 13, a clamping device in accordance with a first preferred embodiment of the invention comprises the following components as discussed in detail below.

Figure 8:
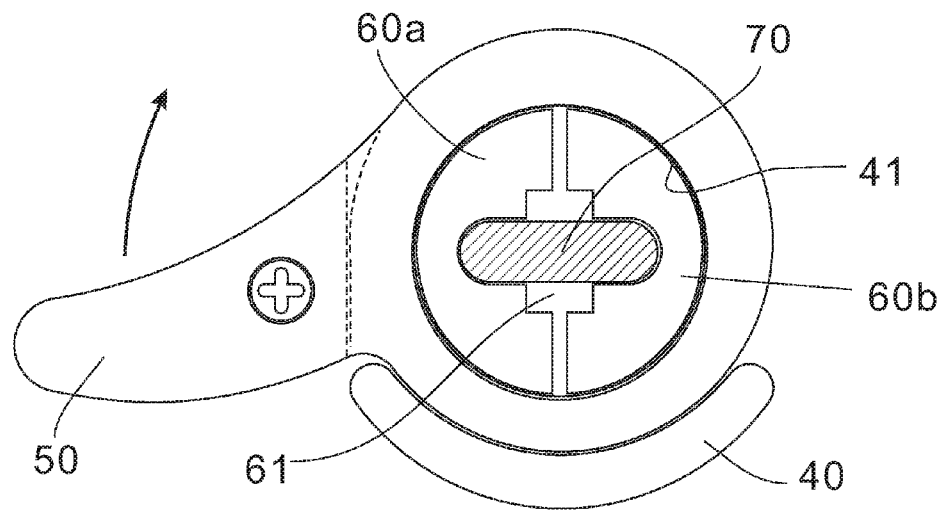
FIG. 8 is a side elevation of the first cam assembly with one work piece being inserted into the space but not fastened.
Figure 9:
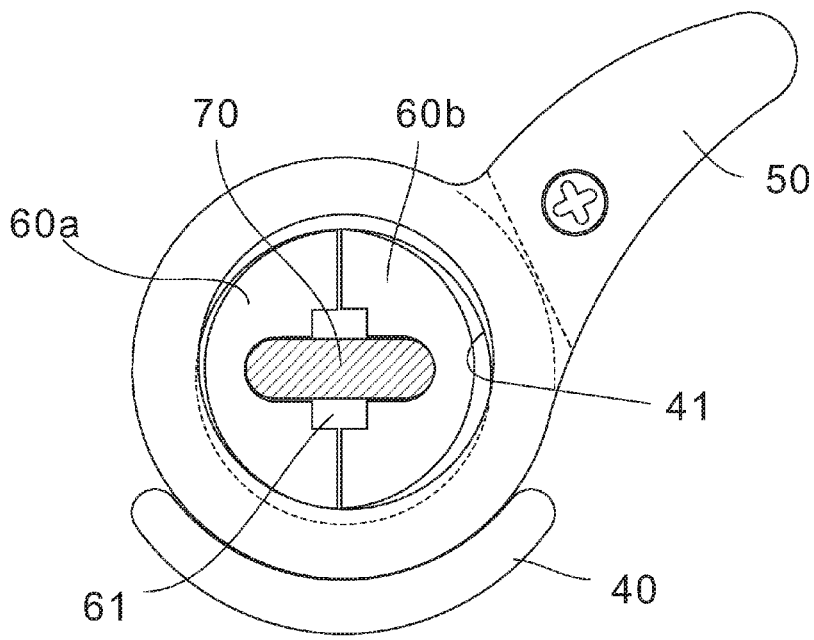
FIG. 9 is a view similar to FIG. 8 showing a clockwise rotation of the cam lever to fasten the work piece.
Figure 10:
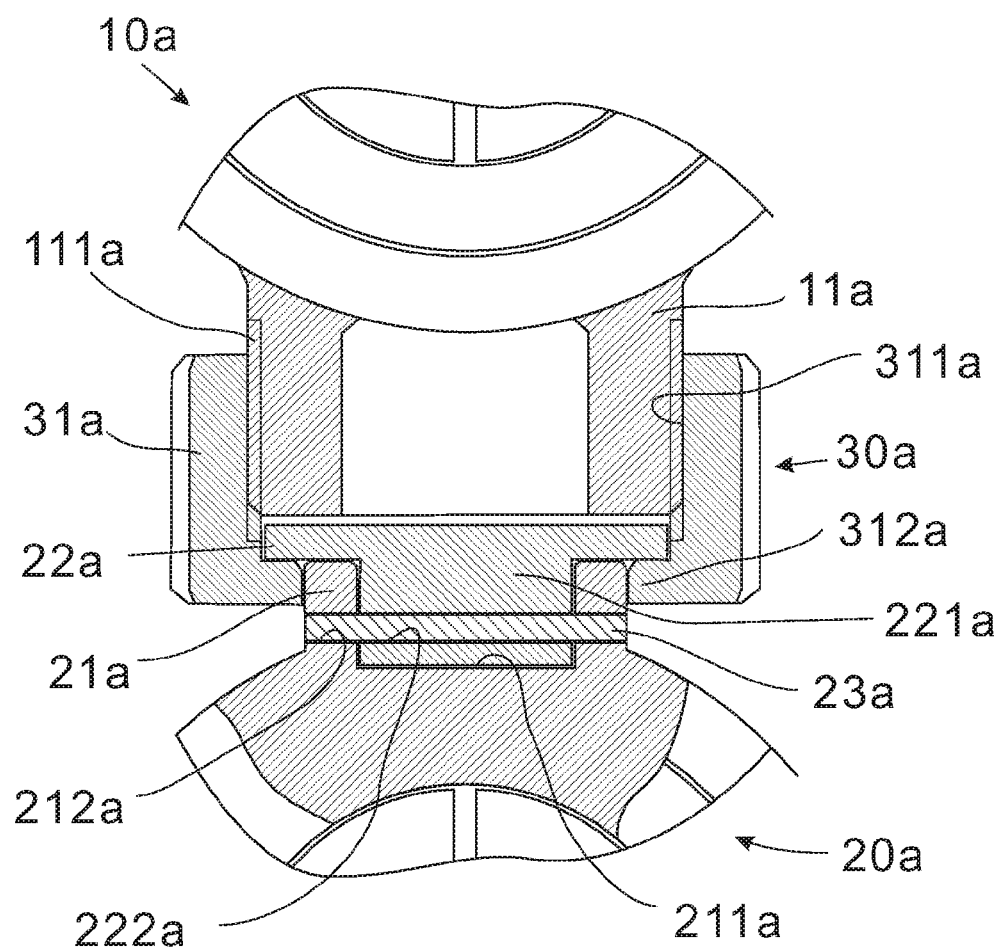
FIG. 10 is a view similar to FIG. 5 but showing a second configuration of the first preferred embodiment.
Figure 11:
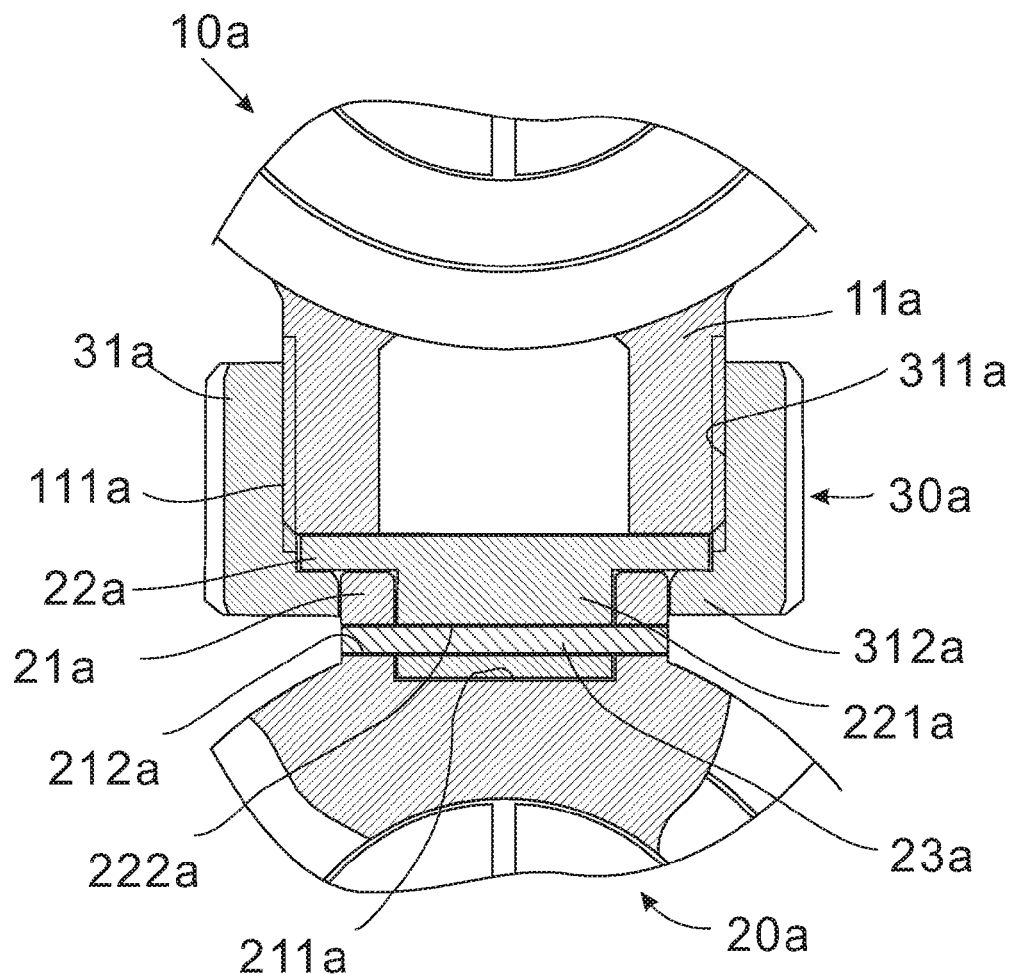
FIG. 11 is a view similar to FIG. 10 showing the first cam assembly and the second cam assembly fastened by the fastening member.
Figure 12:
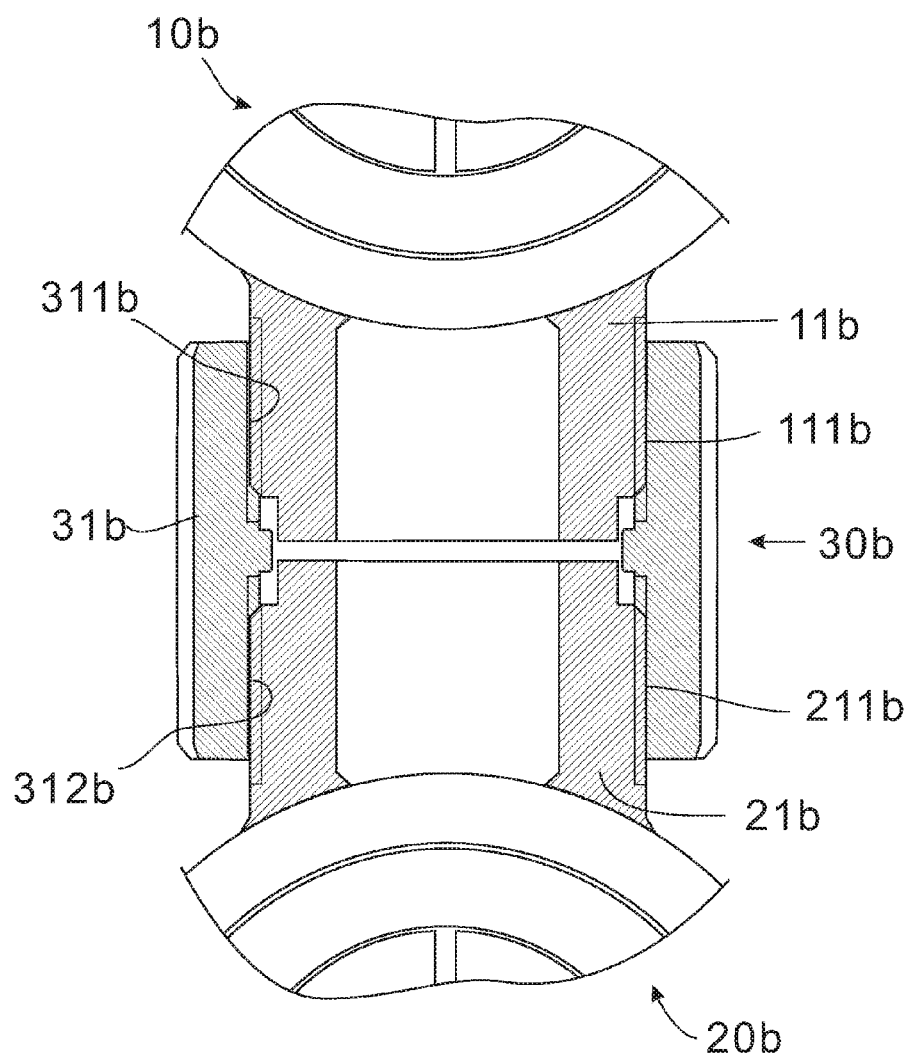
FIG. 12 is a view similar to FIG. 10 but showing a third configuration of the first preferred embodiment.
Figure 13:
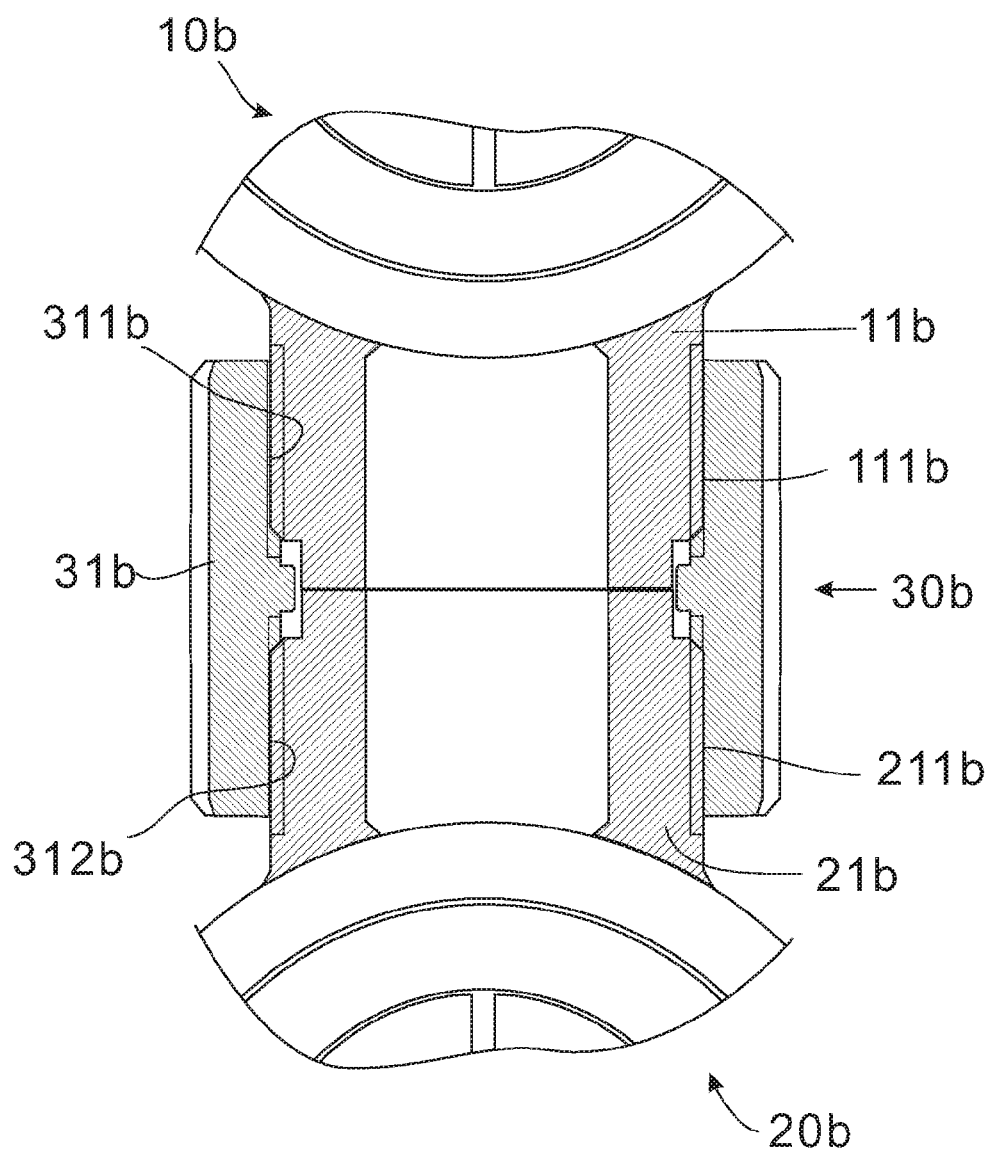
FIG. 13 is a view similar to FIG. 12 showing the first cam assembly and the second cam assembly fastened by the fastening member.
Figure 14:
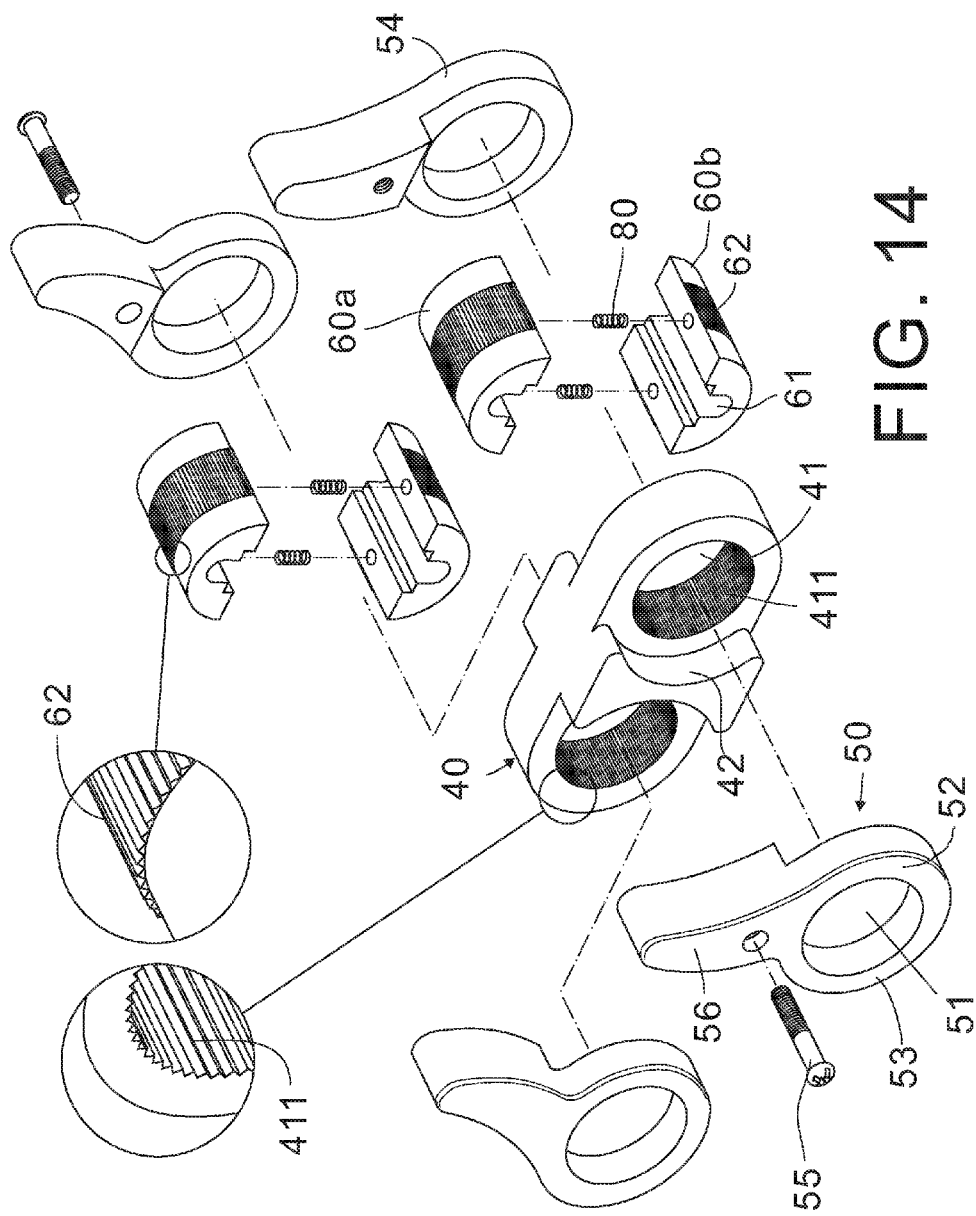
FIG. 14 is an exploded view of a clamping device according to a second preferred embodiment of the invention with a first configuration being shown.
Figure 16:
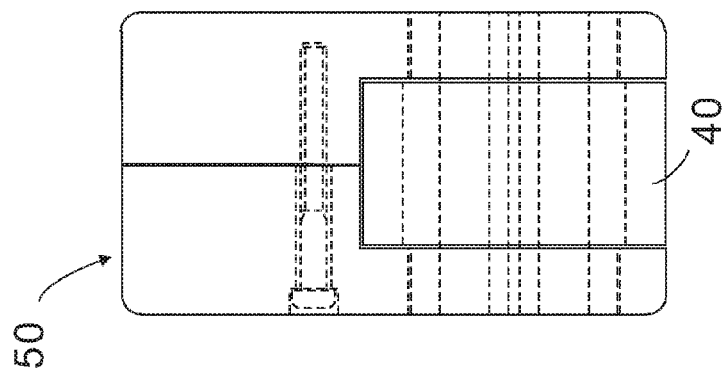
FIG. 16 is another side elevation of FIG. 14.
Figure 15:
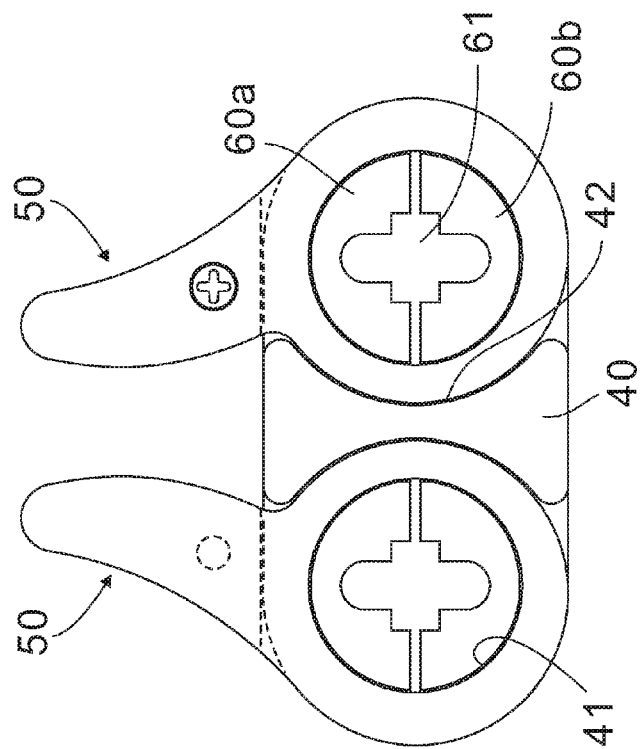
FIG. 15 is a side elevation of the assembled clamping device of FIG. 14.

It is noted that a first configuration of the first preferred embodiment is shown in FIGS. 1 to 9, a second configuration of the first preferred embodiment is shown in FIGS. 10 and 11, and a third configuration of the first preferred embodiment is shown in FIGS. 12 and 13.

As shown in FIGS. 1 to 9, a first cam assembly 10 comprises a cylindrical support 40 including a transverse, cylindrical space 41; a cam lever 50 implemented as a bifurcated cam lever; opposite first work piece clamping member 60a and second work piece clamping member 60b provided in the space 41 and having both sides exposed and a slot 61 defined therebetween, the slot 61 shaped as a cross when viewing in side elevation (see FIG. 2); an annular flange 11 extending from an outer surface of the support 40 and including an annular latching groove 111 at an open end. The exposed sides of the support 40 are disposed in the cam lever 50 which is in turn pivotal about the support 40.

A second cam assembly 20, as a corresponding member of the first cam assembly 10, comprises a cylindrical support 40 including a transverse, cylindrical space 41; a cam lever 50 implemented as a bifurcated cam lever rotatably mounted on both sides of the support 40; opposite first work piece clamping member 60a and second work piece clamping member 60b provided in both the space 41 and the bifurcated portion of the cam lever 50 in a spaced manner with a slot 61 defined therebetween, the slot 61 shaped as a cross when viewing in side elevation (see FIG. 2); an annular flange 21 extending from an outer surface of the support 40 and including an annular reduction 22 at an open end, an annular projection 213 proximate a blind end of the flange 21 and distal the reduction 22, an internal surface 212 extending from the reduction 22 to the projection 213, and external threads 211 on an outer surface.

A fastening member 30 comprises a sleeve shaped main body 31 including internal threads 311 on a portion of its inner surface, a truncated conic section 312 extending from a shoulder joining the internal threads 311 to an open end proximate the first cam assembly 10. The internal threads 311 is secured to the external threads 211 when the fastening member 20 is mounted on a portion of the flange 21 which is in turn tightly put on the flange 11 in friction fit with the projection 213 disposed in the latching groove 111. The first cam assembly 10 may rotate about both the second cam assembly 20 and the fastening member 30 or the second cam assembly 20 may rotate about both the first cam assembly 10 and the fastening member 30 since the first cam assembly 10 and the second cam assembly 20 are only joined not fastened (see FIG. 6).

Figure 1:
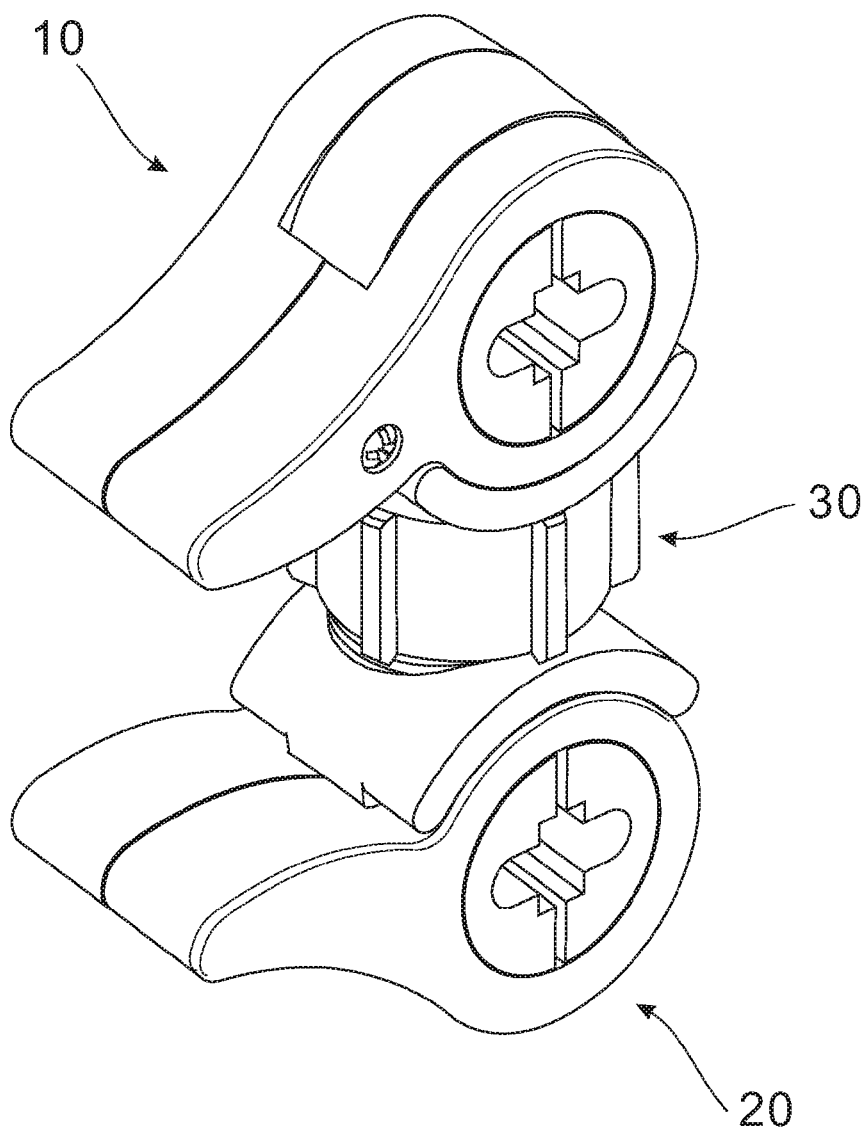
FIG. 1 is a perspective view of a clamping device according to a first preferred embodiment of the invention with a first configuration being shown.
Figure 3:
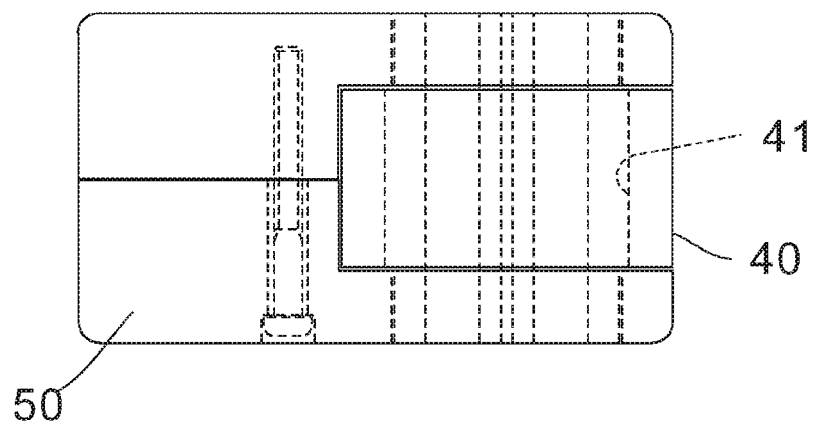
FIG. 3 is a top view of FIG. 1.
Figure 2:
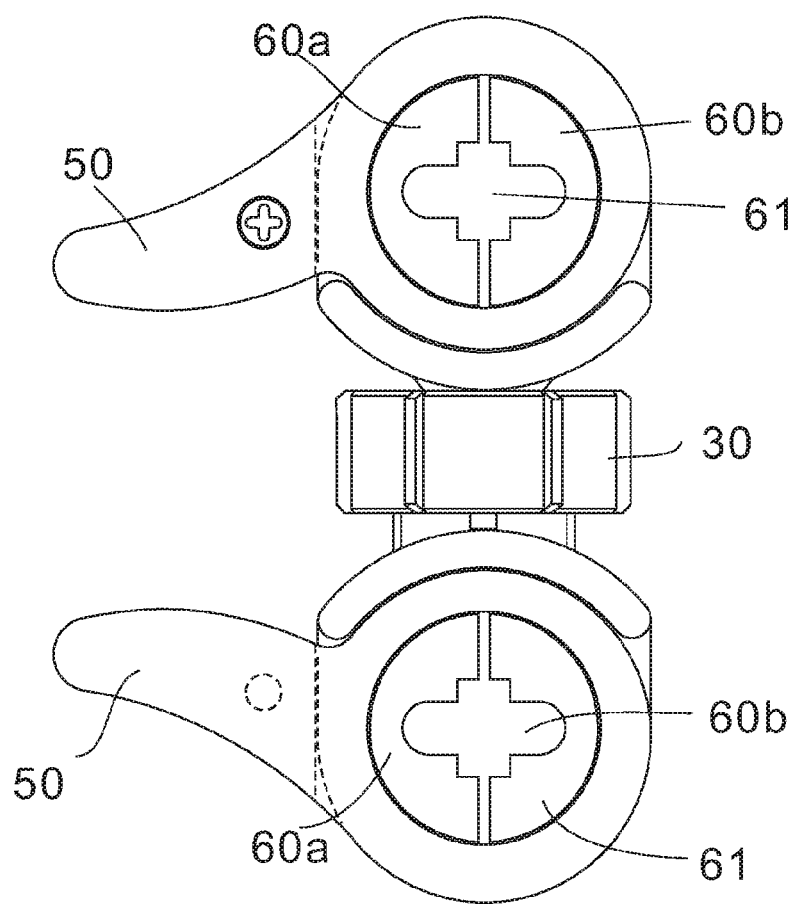
FIG. 2 is a side elevation of FIG. 1.
Figure 4:
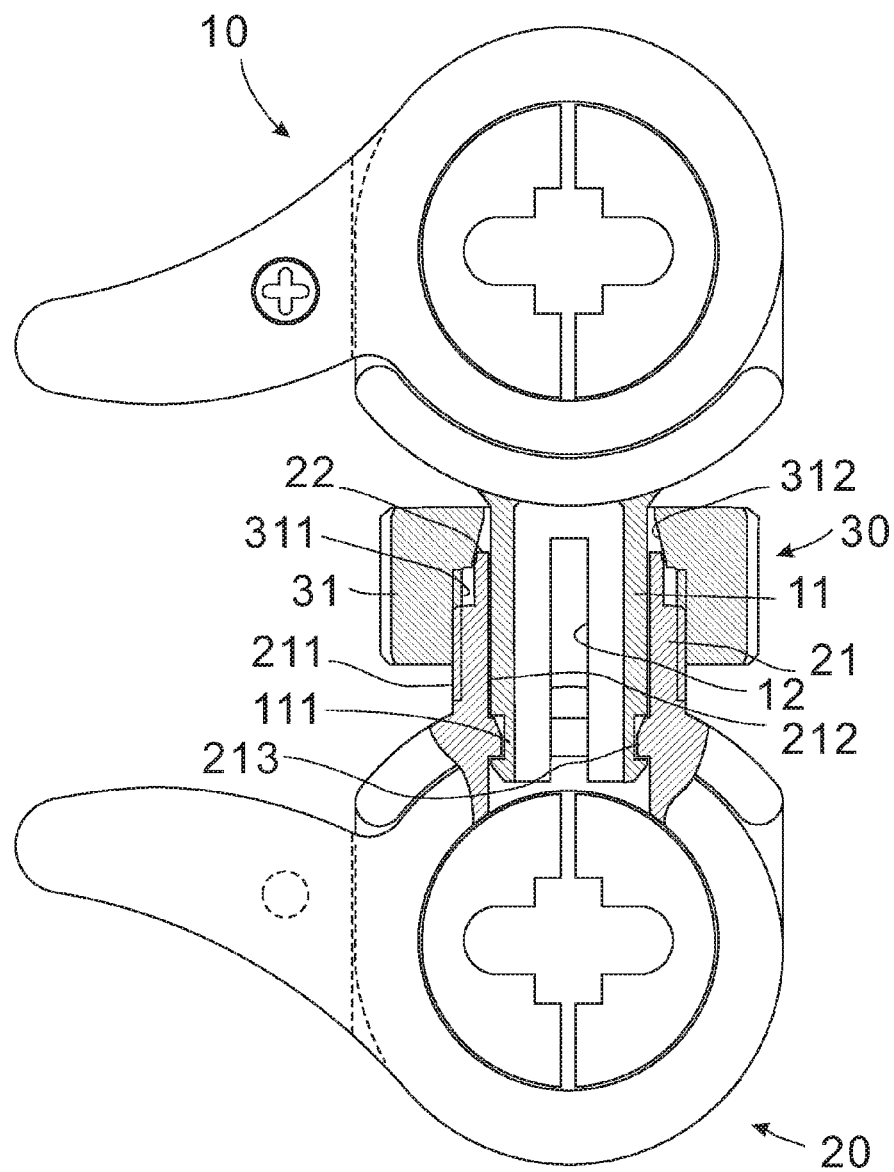
FIG. 4 is a view similar to FIG. 2 with an intermediate portion being shown in section.
Figure 5:
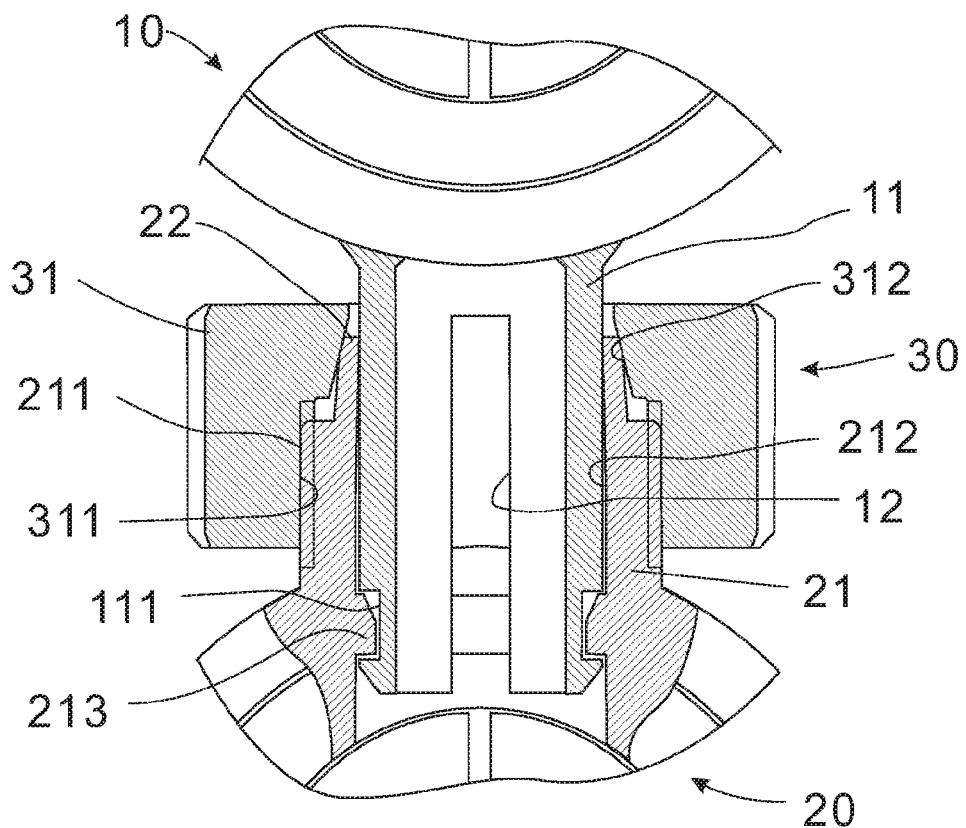
FIG. 5 is a view to FIG. 4 with the first cam assembly and the second cam assembly being fastened by the fastening member.
Figure 6:
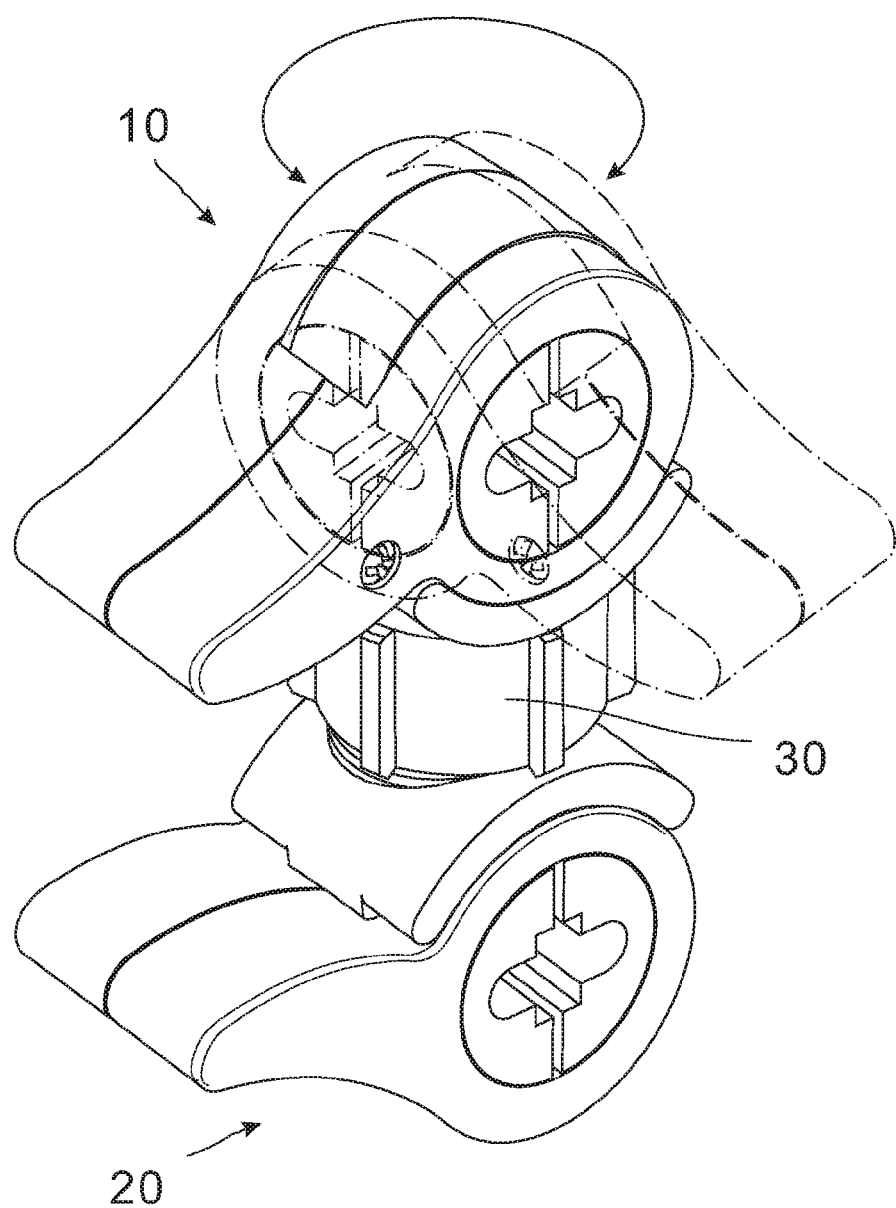
FIG. 6 is a view similar to FIG. 1 showing a rotation of the first cam assembly.

For fastening the first cam assembly 10 and the second cam assembly 20 together, a user may rotate the fastening member 30 from the position shown in FIG. 4 to that shown in FIG. 5 with the reduction 22 moving from one end proximate the internal threads 311 (see FIG. 4) to a position proximate the open end which is in turn proximate the first cam assembly 10 (see FIG. 5). Thus, the truncated conic section 312 urges against the reduction 22 which in turn urges against the flange 11. As a result, the first cam assembly 10, the second cam assembly 20, and the fastening member 30 are fastened together. It is understood that the fastening is not permanent. Thus, a reverse procedure of the above fastening steps can render the first cam assembly 10 and the second cam assembly 20 in an unlocked position.

Figure 7:
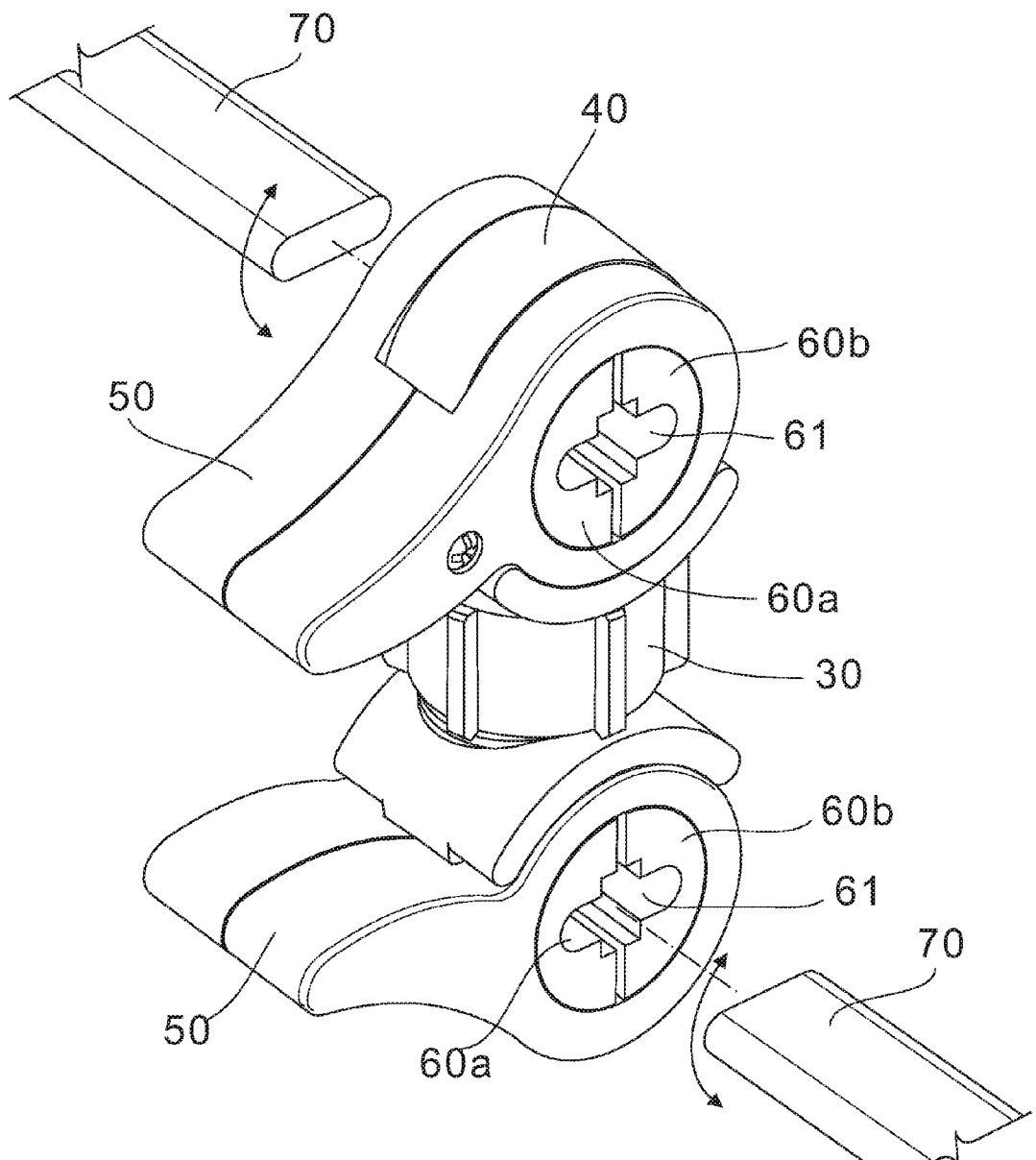
FIG. 7 is a view similar to FIG. 1 showing two work pieces to be held by the clamping device.

As shown in FIGS. 7 to 9, for clamping two work pieces 70 having an oval longitudinal section, a user may insert the work pieces 70 into the slots 61. Next, the user may rotate cam lever 50 clockwise to cause its cam surface to follow a concave surface of the support 40. And in turn, the first work piece clamping member 60a and the second work piece clamping member 60b are pushed toward each other. As a result, the work piece 70 is clamped.

As shown in FIGS. 10 and 11, a second configuration of the first preferred embodiment is shown. The characteristics of the second configuration are substantially the same as that of the first configuration except the following: The first cam assembly 10a comprises an extending annular flange 11a including external threads 111a. The second cam assembly 20a, as a corresponding member of the first cam assembly 10a, comprises an annular flange 21a having a bottom 211a and two opposite, aligned holes 212a; an annular spacer 22a engaging the open end of the flange 21a and including an annular protrusion 221a engaging the bottom 211a and having a radial through hole 222a; a pin 23a inserted into the holes 212a and the hole 222a to join the protrusion 221a (i.e., the spacer 22a) and the flange 21a (i.e., the second cam assembly 20a). The fastening member 30a comprises a hollow, cylindrical main body 31a including internal threads 311a on an inner surface, and an internally extending rim 312a on one open end proximate the second cam assembly 20a. In an assembled state, the internal threads 311a of fastening member 30a are threadedly secured to the internal threads 111a of the flange 11a with the spacer 22a engaging the rim 312a and the rim 312a engaging the flange 21a.

For fastening the first cam assembly 10a and the second cam assembly 20a together, a user may rotate the fastening member 30a from the position shown in FIG. 10 to that shown in FIG. 11 to urge the flange 11a against the spacer 22a. As a result, the first cam assembly 10a, the second cam assembly 20a, and the fastening member 30a are fastened together. It is understood that the fastening is not permanent. Thus, a reverse procedure of the above fastening steps can render the first cam assembly 10a and the second cam assembly 20a in an unlocked position.

As shown in FIGS. 12 and 13, a third configuration of the first preferred embodiment is shown. The characteristics of the third configuration are substantially the same as that of the second configuration except the following: The first cam assembly 10b comprises an extending annular flange 11b including external threads 111b. The second cam assembly 20a, as a mirror image of the first cam assembly 10b, comprises an annular flange 21b including external threads 211b. The fastening member 30b comprises a hollow, cylindrical main body 31b including internal threads 311b on a first portion of an inner surface, internal threads 312b on a second portion of an inner surface, and an intermediate, internally extending rim (not numbered) separating the internal threads 311a from the internal threads 312b. In an assembled state, the internal threads 311b of fastening member 30b are threadedly secured to the internal threads 111b of the flange 11b and the internal threads 312b of fastening member 30b are threadedly secured to the internal threads 211b of the flange 21b and the flange 11b is spaced from the flange 21b.

For fastening the first cam assembly 10b and the second cam assembly 20b together, a user may rotate the fastening member 30b from the position shown in FIG. 12 to that shown in FIG. 13 to urge the flange 11b against the flange 21b. As a result, the first cam assembly 10b, the second cam assembly 20b, and the fastening member 30b are fastened together. It is understood that the fastening is not permanent. Thus, a reverse procedure of the above fastening steps can render the first cam assembly 10b and the second cam assembly 20b in an unlocked position.

Figure 19:
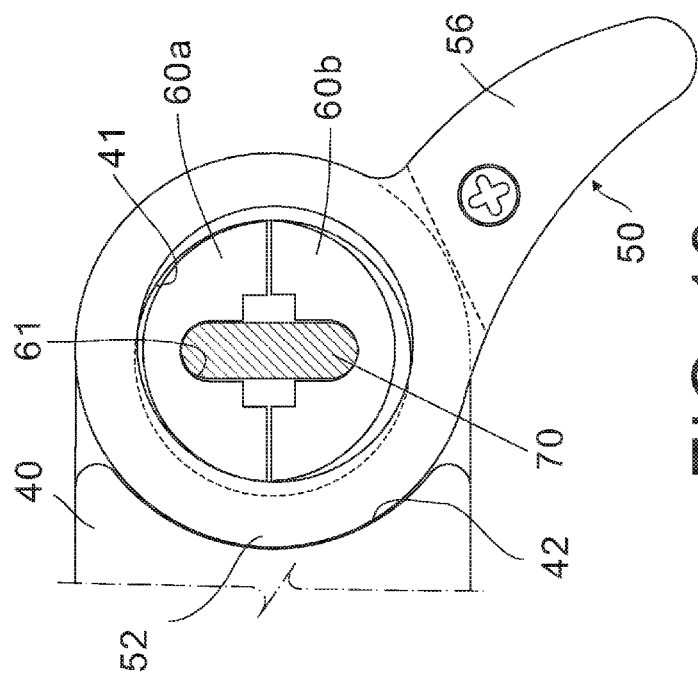
FIG. 19 is a view similar to FIG. 18 showing the work piece being fastened by clockwise turning the cam lever.
Figure 21:
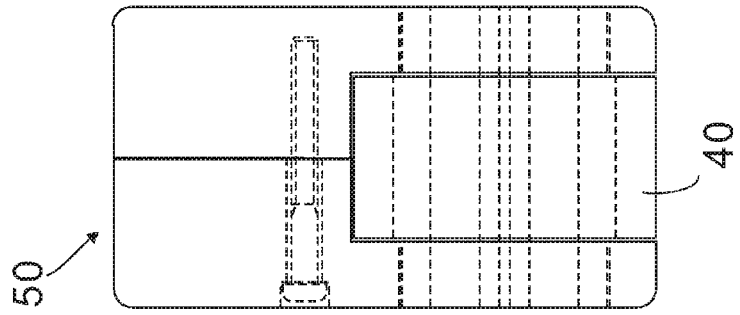
FIG. 21 is another side elevation of FIG. 20.
Figure 20:
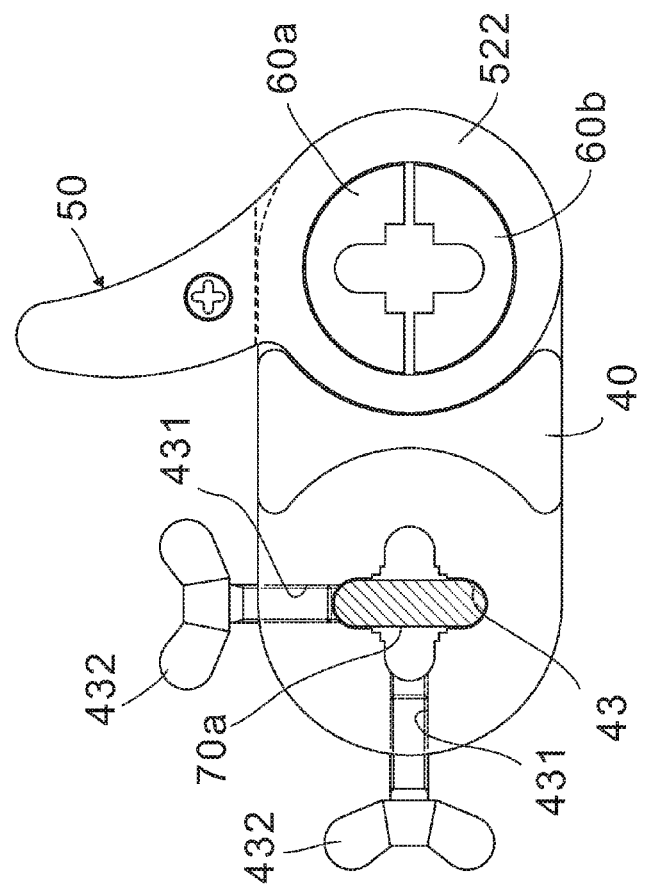
FIG. 20 is a side elevation showing a second configuration of the second preferred embodiment.
Figure 23:
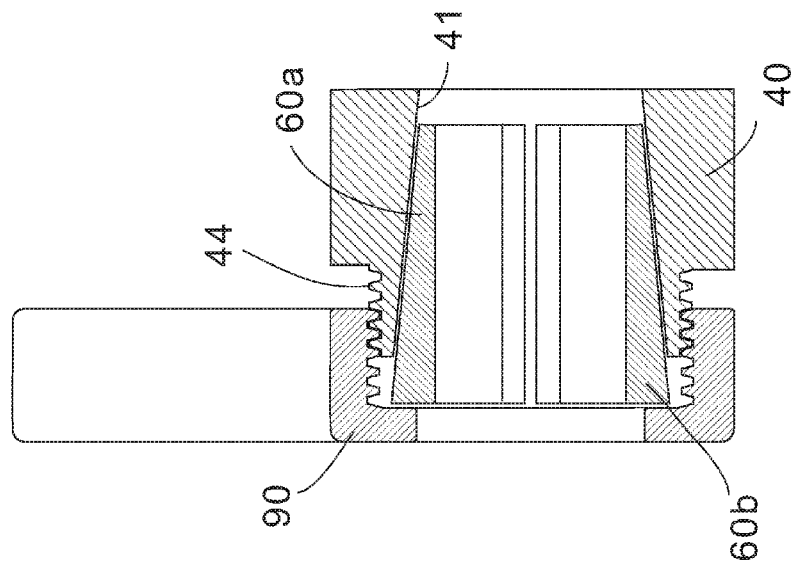
FIG. 23 is a longitudinal sectional view of the main portion of FIG. 22.
Figure 22:
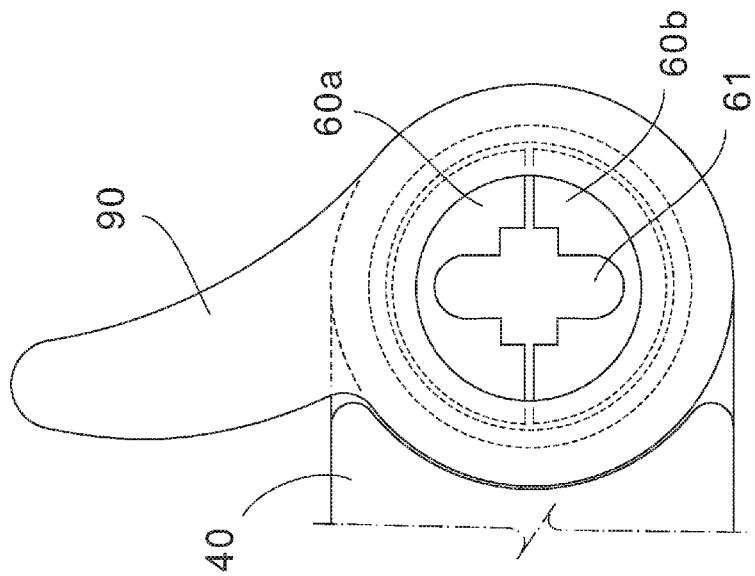
FIG. 22 is a side elevation showing an exemplary unit of a third configuration of the second preferred embodiment.

Referring to FIGS. 14 to 23, a clamping device in accordance with a second preferred embodiment of the invention is shown. It is noted that a first configuration of the second preferred embodiment is shown in FIGS. 14 to 19, a second configuration of the second preferred embodiment is shown in FIGS. 20 and 21, and a third configuration of the second preferred embodiment is shown in FIGS. 22 and 23.

As shown in FIGS. 14 to 19, an oval support 40 includes two transverse, cylindrical spaces 41 each having teeth 411 on an annular inner surface, and two opposite double-concave members 42 each between the spaces 41. Two sets of two opposite first work piece clamping member 60a and second work piece clamping member 60b are provided in a spaced manner in the space 41. The first work piece clamping member 60a and the second work piece clamping member 60b form a cylinder with a slot 61 therebetween. Each of the first work piece clamping member 60a and second work piece clamping member 60b include teeth 62 on a central portion of a curved, outer surface, the teeth 62 being in close proximity to or engaging the teeth 411. Each of the first work piece clamping member 60a and second work piece clamping member 60b have both side extending out of the space 41. Two sets of two helical springs 80 are provided in which each spring 80 has both ends anchored in the first work piece clamping member 60a and second work piece clamping member 60b respectively. Thus, the first work piece clamping member 60a and second work piece clamping member 60b are spaced each other. Four cam levers 50 each comprises a lever 56, a ring 54 integrally formed with the lever 56 and including a central channel 51, a first eccentric section 52, and a second eccentric section 53 having a width less than that of the first eccentric section 52, and a screw 55 driven through one cam lever 50 into an opposing cam lever 50 of different sides to fasten the two cam levers 50 and the support 40 together with the second eccentric section 53 bearing against the concave surface of the double-concave member 42 and both sides of the first work piece clamping member 60a and the second work piece clamping member 60b rotatably disposed in the rings 54 (i.e., the first work piece clamping member 60a and the second work piece clamping member 60b being rotatable).

Figure 18:
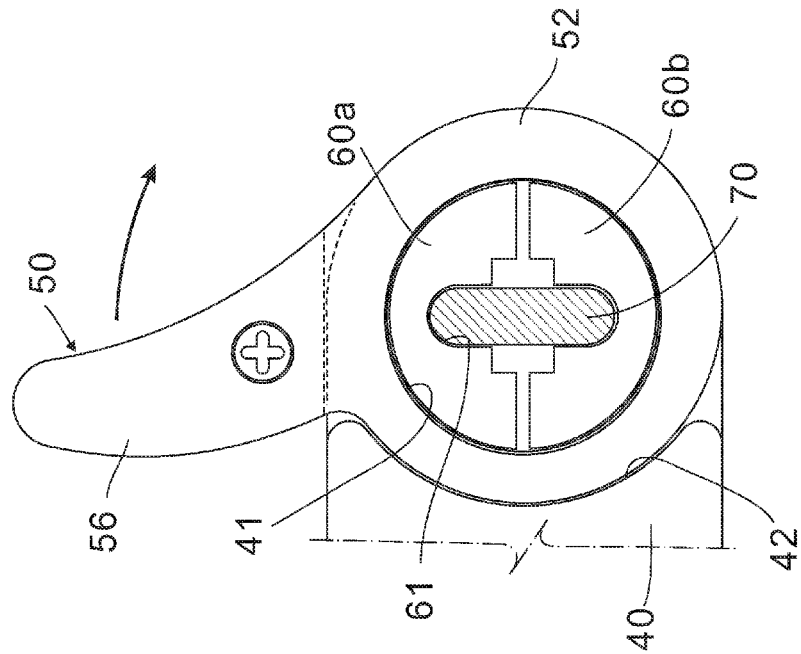
FIG. 18 shows the right portion of FIG. 15 with the work piece inserted into the slot.

As shown in FIGS. 17 to 19, for clamping two work pieces 70 having an oval longitudinal section, a user may insert the work pieces 70 into the slots 61. Next, the user may rotate the cam levers 50 of the same set clockwise to cause cam surfaces of the rings 54 to follow concave surfaces of the double-concave members 42. And in turn, the teeth 62 of the first work piece clamping member 60a and the second work piece clamping member 60b are pushed to engage the teeth 411. And in turn, the first work piece clamping member 60a and the second work piece clamping member 60b are pushed toward each other. As a result, the work piece 70 is clamped.

As shown in FIGS. 20 and 21, a second configuration of the second preferred embodiment is shown. The characteristics of the second configuration are substantially the same as that of the first configuration except the following: Two wing nuts 432 are provided and each comprises external threads 431. Each of the first work piece clamping member 60a and the second work piece clamping member 60b comprise a threaded hole threadedly receiving the threads 431. A slot 43 defined by the first work piece clamping member 60a and the second work piece clamping member 60b is shaped as a true cross.

As shown in FIGS. 22 and 23, a third configuration of the second preferred embodiment is shown. The characteristics of the third configuration are substantially the same as that of the second configuration except the following: The support 40 comprises a tapered channel 41 and externally threaded section 44. The first work piece clamping member 60a and the second work piece clamping member 60b together form a truncated cone complementarily disposed in the channel 41. An internally threaded cavity is formed in the cam lever 90 to threadedly secure to the externally threaded section 44.

Referring to FIGS. 24 to 27, a clamping device in accordance with a third preferred embodiment of the invention is shown. It is noted that a first configuration of the third preferred embodiment is shown in FIGS. 24 and 25, and a second configuration of the third preferred embodiment is shown in FIGS. 26 and 27.

In FIGS. 24 and 25, another support 40 is provided and engages the cam levers 50. Another two cam levers 50 are provided to retain another support 40 therebetween.

In FIGS. 26 and 27, another support 40 is provided and engages the cam levers 50. Another two cam levers 50 are provided to retain another support 40 therebetween. Further, two wing nuts 432 are provided and each comprise external threads 431. Each of the first work piece clamping member and the second work piece clamping member comprise a threaded hole threadedly receiving the threads 431. A slot 43 defined by the first work piece clamping member and the second work piece clamping member is shaped as a true cross.

While the invention has been described in terms of preferred embodiments, those skilled in the art will recognize that the invention can be practiced with modifications within the spirit and scope of the appended claims.

What is claimed is:

1. A clamping device comprising:
   a first cam assembly comprising a hollow first support, opposite first and second work piece clamping members partially disposed in the first support with a first slot defined between the first and second work piece clamping members, a bifurcated first cam lever disposed on both sides of the first and second work piece clamping members with the first support disposed in the first cam lever, and an annular first flange extending from an outer surface of the first support and including an annular latching groove at an open end;
   a second cam assembly comprising a hollow second support, opposite third and fourth work piece clamping members partially disposed in the second support with a second slot defined between the third and fourth work piece clamping members, a bifurcated second cam lever disposed on both sides of the third and fourth work piece clamping members with the second support disposed in the second cam lever, and an annular second flange extending from an outer surface of the second support and including an annular reduction at an open end, an annular projection distal the reduction, and external threads wherein the second flange is put on the first flange with the projection rotatably disposed in the latching groove; and
   a fastening member comprising a partially threaded inner surface threadedly secured to the external threads, and a truncated conic section extending from one end of the partially threaded inner surface to an open end proximate the first cam assembly;
   wherein a rotation of the fastening member along a predetermined direction urges the truncated conic section against the reduction which in turn urges against the first flange, thereby fastening the first cam assembly, the second cam assembly, and the fastening member together;
   wherein a clockwise rotation of the first cam lever pushes the first work piece clamping member and the second work piece clamping member toward each other by cooperating with the first support; and
   wherein a clockwise rotation of the second cam lever pushes the third work piece clamping member and the fourth work piece clamping member toward each other by cooperating with the second support.

2. A clamping device comprising:
   a first cam assembly comprising a hollow first support, opposite first and second work piece clamping members partially disposed in the first support with a first slot defined between the first and second work piece clamping members, a bifurcated first cam lever disposed on both sides of the first and second work piece clamping members with the first support disposed in the first cam lever, and an annular first flange extending from an outer surface of the first support and including external threads;

a second cam assembly comprising a hollow second support, opposite third and fourth work piece clamping members partially disposed in the second support with a second slot defined between the third and fourth work piece clamping members, a bifurcated second cam lever disposed on both sides of the third and fourth work piece clamping members with the second support disposed in the second cam lever, an annular second flange extending from an outer surface of the second support, a spacer disposed in the second flange and seated on the second flange, and a pin for fastening the second flange and the spacer together; and a fastening member comprising internal threads and an internally extending rim on one open end proximate the second cam assembly;

wherein a rotation of the fastening member along a predetermined direction urges the first flange against the spacer, thereby fastening the first cam assembly, the second cam assembly, and the fastening member together;

wherein a clockwise rotation of the first cam lever pushes the first work piece clamping member and the second work piece clamping member toward each other by cooperating with the first support; and wherein a clockwise rotation of the second cam lever pushes the third work piece clamping member and the fourth work piece clamping member toward each other by cooperating with the second support.

3. A clamping device comprising:

a support comprising two cylindrical spaces each having internal teeth, and two opposite double-concave members each disposed between the spaces;

two sets of two spring biased, opposite first and second work piece clamping members wherein the first and second work piece clamping members of the same set are partially disposed in the support with a slot defined between the first and second work piece clamping members of the same set, and each of the first and second work piece clamping members of the same set include a curved externally threaded section being in close proximity to the teeth or engaging the teeth;

two bifurcated cam levers each disposed on both sides of the first and second work piece clamping members of the same set with the support partially disposed in each cam lever wherein each cam lever bears against the double-concave member;

wherein a clockwise rotation of one cam lever pushes the first work piece clamping member and the second work piece clamping member of the same set toward each other by riding the teeth of the support along the externally threaded sections of the first work piece clamping member and second work piece clamping member of the same set; and wherein a clockwise rotation of the other cam lever pushes the first work piece clamping member and the second work piece clamping member of the same set toward each other by riding the teeth of the support along the externally threaded sections of the first work piece clamping member and second work piece clamping member of the same set.

* * * * *